F. M. STEADMAN.
AUTOMATIC FOCUSING DEVICE FOR CAMERAS.
APPLICATION FILED NOV. 10, 1914.
1,244,254.
Patented Oct. 23, 1917.
2 SHEETS—SHEET 2.
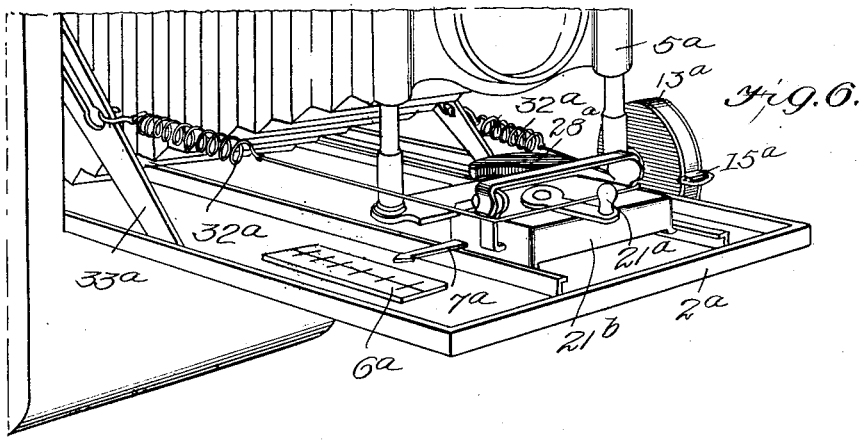
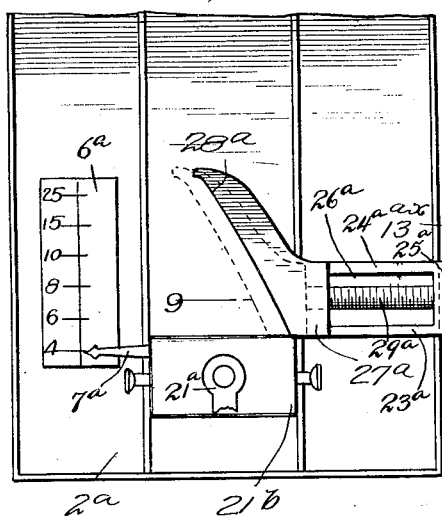
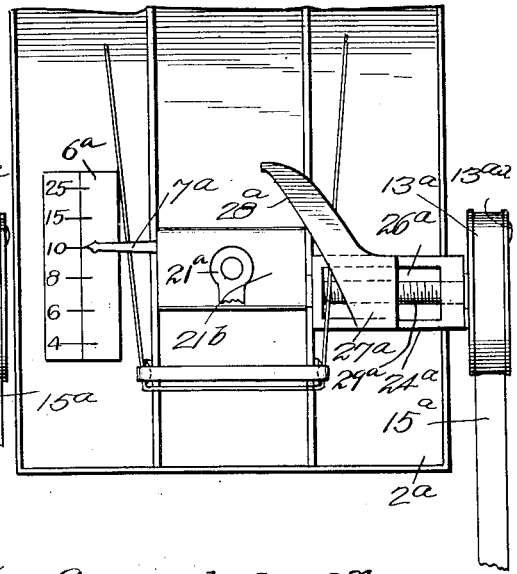
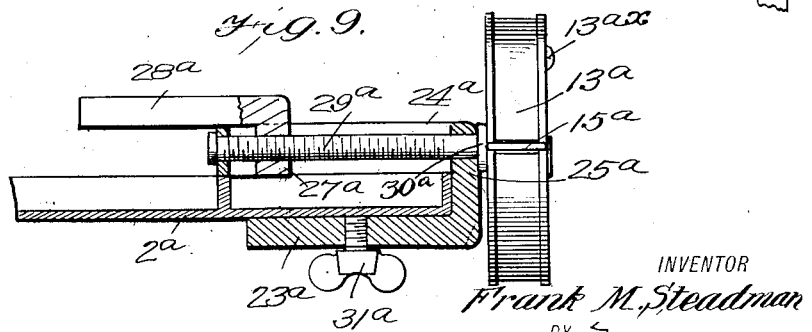
WITNESSES
INVENTOR
Frank M. Steadman
BY
ATTORNEYS

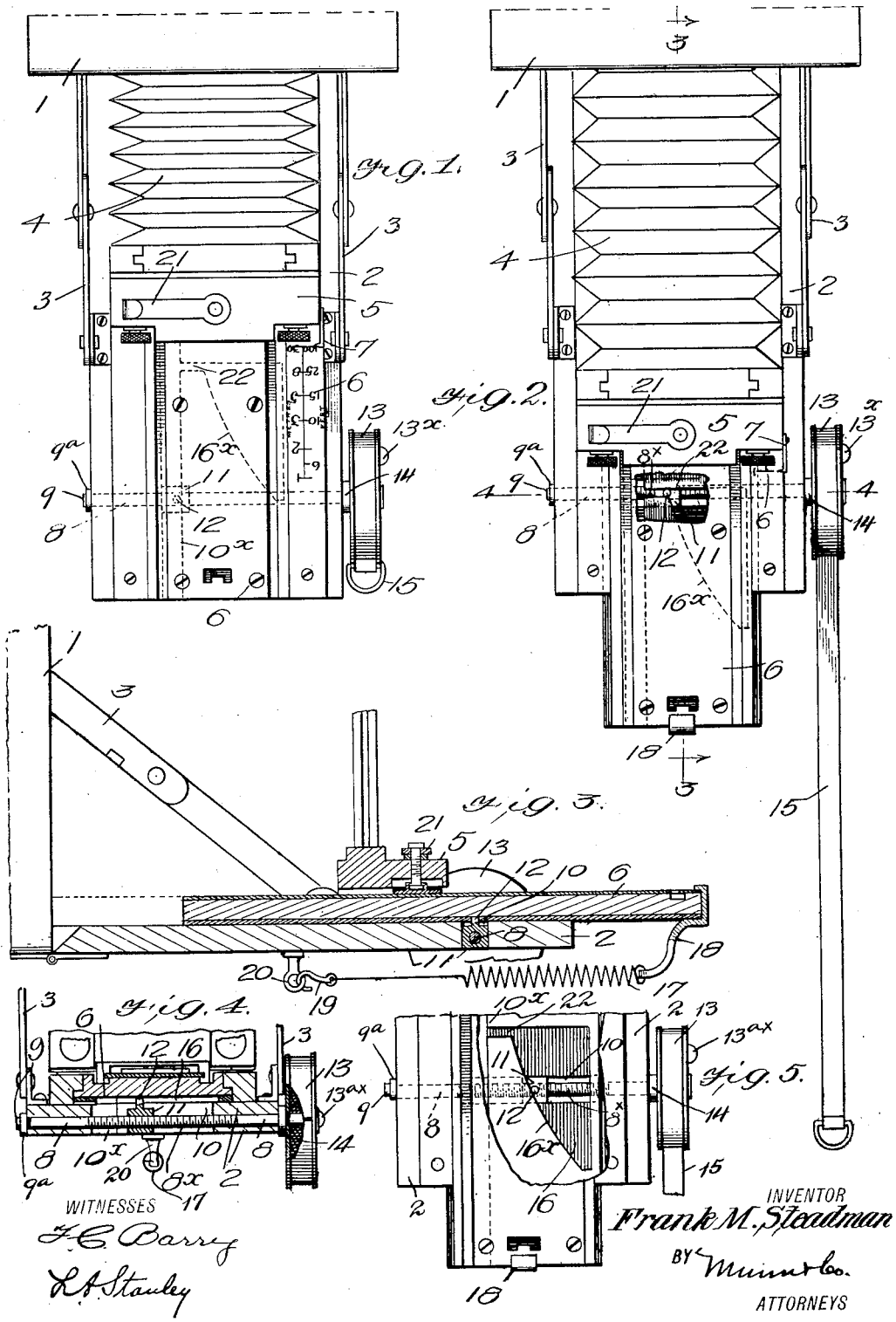

UNITED STATES PATENT OFFICE.

FRANK M. STEADMAN, OF WASHINGTON, DISTRICT OF COLUMBIA.

AUTOMATIC FOCUSING DEVICE FOR CAMERAS.

1,244,254.  Specification of Letters Patent.  Patented Oct. 23, 1917.

Application filed November 10, 1914. Serial No. 871,282.

*To all whom it may concern:*

Be it known that I, FRANK M. STEADMAN, a citizen of the United States, and a resident of Washington, in the District of Columbia, have made certain new and useful Improvements in Automatic Focusing Devices for Cameras, of which the following is a specification.

My invention relates to improvements in automatic focusing devices for cameras, and it consists in the combinations, constructions and arrangements herein described and claimed.

An object of my invention is to provide a device by means of which a camera may be accurately and automatically focused, thereby obviating the danger of spoiling the plate or film by neglect to set the camera at the proper focus.

A further object of my invention is to provide a device of the type described which may form an attachment for a camera having an extensible bellows and a movable lens.

A further object of my invention is to provide a device of the type described having a flexible member which may be extended manually from the camera to the object to be photographed and in which the movement of the flexible member serves to bring the device into focus.

Other objects and advantages will appear in the following specification and the novel features of the device will be particularly pointed out in the appended claims.

My invention is illustrated in the accompanying drawings forming part of this application in which—

Figure 1 is a plan view of a camera provided with my improved automatic focusing device, showing the latter in one position, Fig. 2 is a view similar to Fig. 1 showing the apparatus in a shifted position, Fig. 3 is a section along the line 3—3 of Fig. 2, Fig. 4 is a section along the line 4—4 of Fig. 2, Fig. 5 is a plan view of a portion of the device, certain parts being broken away for the sake of clearness, Fig. 6 is a view of a modified form of the device, Fig. 7 is a plan view of a portion of the apparatus shown in Fig. 6, Fig. 8 is a view similar to Fig. 7 showing the aparatus in another position, and Fig. 9 is a section along the line 9—9 of Fig. 7.

In carrying out my invention I may make use of a camera known as the drop-front type, that is to say in which the case 1 is provided with a hinged door 2 which may be dropped downwardly and which may be held in position by braces 3. In this type of camera the bellows 4 may be extended by pulling the lens frame 5 forwardly. The latter is mounted on a slidable extension 6 which may be moved relatively to the door 2 as hereinafter explained. The door 2 is provided with a scale over which a pointer 7 is designed to move. The lens frame 5 may be pulled out and the pointer 7 moves with it so that it may be set at a figure on the scale which gives the proper focus. The description of the device thus far concerns the ordinary camera and forms no part of my invention except in so far as the parts hereinafter enumerated to effect a new and useful result.

Referring now particularly to Figs. 3, 4 and 5 I have shown therein a transverse rod 8 which is revolubly mounted in the door 2 and which is provided with threads 8$^x$ at its central portion as clearly shown in Fig. 4. One end of the rod 8 is provided with a collar 9 which bears on a side plate 9$^a$ so as to prevent any longitudinal movement of the rod.

The door 2 is provided with a transverse slot 10 in which is disposed a threaded block or nut 11 having a pin 12 projecting therefrom. The opposite end of the rod 8 is extended and a reel 13 is secured to the extension, a collar 14 being provided between the reel and the door 2, as shown in Fig. 4. Upon the reel is wound a flexible strip 15, after the manner of a tape measure, an opening being provided in the casing of the reel for permitting the entrance and exit of the flexible member 15, while a spring (not shown) may also be provided for taking up the slack when the end of the flexible member 15 is moved toward the camera, after the manner of an ordinary tape measure holder.

The bottom of the extension 6 is provided with a plate 16 having a curved cam surface 16$^x$ which is arranged to engage the pin 12. A spring 17 is connected at one end to a downwardly extending arm 18 on the end of the extension 6 and at the other end is provided with a hook 19 which may be secured to an eye 20 or other suitable fastening means on the outside of the door 2 as will be hereinafter explained.

From the foregoing description of the various parts of the device the operation thereof may be readily understood.

The door 2 of the camera is unlatched and swung down in the usual manner and the bellows together with the lens frame 5 is pulled forward until the pointer 7 registers with the 100 foot mark, as shown in Fig. 1. The lens frame and bellows are now locked in this position by turning the locking member 21. This clamps the lens frame to the extension 6 which is in its normal position shown in Fig. 1.

The operator now takes hold of the end of the extension 6 and pulls the latter downwardly until the pin 12 in the block 11, which, when the tape or flexible member 15 is retracted, is in alinement with a slot 10$^x$ running longitudinally of the extension 6 (see Figs. 1, 4 and 5) now comes in registration with a slot 22 extending at right angles to the slot 10$^x$. In order to gage the distance to which the extension 6 must be moved and in order to bring the slot 22 into registration with the pin 12 I pull the extension out until the pointer 7 registers with the one-meter mark or any other predetermined close distance mark when the slot 22 will be just opposite the pin. If now the flexible member or tape 15 be pulled outwardly the rotation of the spindle 8 will cause the block or nut 11 to travel from the left to the right, as shown in Figs. 2 and 4. When the pin 12 enters the slot 22 the spring 17, which, up to this time has been free, that is to say it has been suspended from the arm 18 only, is now connected with the eye 20 by stretching the spring and placing the hook 19 in the eye. This will put the extension 6 under spring tension which tends to pull it inwardly into its normal position, but it is prevented from movement by the pin 12 in the slot 22.

The tape or flexible member 15 may now be moved outwardly toward the object. The first movement of one meter (which includes the movement to advance the pin into the slot 22) merely causes the pin to travel to the end of the slot 22, but beyond one meter the movement of the pin now permits the cam surface 16$^x$ to engage the pin and as the latter continues to move the extension 6 will be retracted by means of the spring 17. The cam surface 16$^x$ is curved or cut in such a fashion that the extension will be retracted so as to always keep the device in focus. Thus, if the tape is pulled out to a distance of fifteen feet the extension will be retracted until the pointer registers with the mark 15 on the door of the camera. If the tape is pulled out twenty-five feet, it is obvious that the retraction will be greater and the pointer will be at the numeral 25 on the scale. The formation of the cam surface 16$^x$ is determined by calculation or experiment so as to accurately focus the device for any object within the limits of the focusing scale, so that if one pulls out the tape to the object the camera is automatically brought to the proper focus for that object. The tape may now be dropped or placed to one side out of the field of view, the catch (not shown) in the tape casing 13 preventing the retraction of the tape.

The object may now be photographed. The spring 17 may be released from the eye 20 and the button 13$^x$ may be pressed, thereby causing the tape to retract in the ordinary manner, the extension 6 being first pulled outwardly to permit the movement of the pin 12 again through the slot 22 and into the slot 10$^x$, when the device may be folded as in the usual manner.

In Figs. 6 to 9 inclusive I have shown a modified form of the device consisting of an attachment for the ordinary drop-front camera. In this instance the door 2$^a$ is provided with a scale 6$^a$ over which a pointer 7$^a$ carried by a slidable locking device 21$^b$ having a latch or locking lever 21$^a$, is arranged to travel, as shown in Fig. 6. In the ordinary camera not provided with my attachment the lens frame 5$^a$ to which the locking member 21$^b$ is secured is pulled forwardly until the pointer 7$^a$ is at the desired place on the scale which is regarded as providing for the proper focus for the object to be measured.

My attachment consists of a U-shaped frame having a bottom portion 23$^a$, a top portion 24$^a$, and an intermediate connecting portion 25$^a$. The top portion 24$^a$ is provided with a slot 26$^a$ in which a downwardly extending lug 27$^a$ having an integral laterally extending cam member 28$^a$ is designed to slide. The lug is threaded to engage the threaded spindle 29$^a$ which is mounted in the upper portion of the frame as shown in Fig. 9. A tape casing 13$^a$ having the usual spring and locking device on the inside (not shown) and provided with a release button 13$^{ax}$ is rigidly secured to the frame by a fastening device 30$^a$ and the reel of this tape casing or receptacle is a prolongation of the spindle 29$^a$ as in the preferred form of the device.

In the use of this modified form the lens frame is pulled out until the pointer registers with the four foot mark on the scale or such mark as would indicate the nearest distance which the camera can be placed from the object in order to have the lens in good focus for that distance. The attachment is now placed in position on the door in such a manner that the block or threaded lug 27$^a$ is just behind the frame of the locking member 21ᵇ. The cam member 28ᵃ is in the dotted line position shown in Fig. 7, the tape or flexible member 15ᵃ being within the casing 13ᵃ. The set screw 31ᵃ is now tightened so as to hold the attachment securely to the door 2ᵃ. Springs 32ᵃ (see Fig. 6) are secured to some portion of the camera such as the brace members 33ᵃ at one end and the locking frame 21ᵇ at the other, thus exerting a tension on the lens frame to which the locking device 21ᵇ is connected tending to pull the lens inwardly.

The flexible member or tape 15ᵃ is now pulled out and the threaded lug 27ᵃ will begin to move toward the right in Fig. 7 and when four feet of tape has been pulled out the cam surface will be in the position shown in Fig. 7 in full lines so that further movement will permit the frame of the locking member 21ᵇ to be moved inwardly under the tension of the springs 32ᵃ.

The flexible member 15ᵃ is moved out as far as the object and the lens frame will move inwardly so that it is in proper focus for taking a view of an object whose distance is equal to the length of the flexible member which has been pulled out from the reel or casing 13ᵃ. In Fig. 8 I have shown the pointer 7ᵃ as indicating a distance of ten feet. The object may be photographed and the lens will be at the proper focal distance. The springs 32ᵃ may now be released and the clamping device may be removed by unscrewing the set screw 31ᵃ.

It will thus be seen that I have provided a device in which the mere extension of a flexible member such as a tape from the camera to the object to be photographed will at once bring the camera into proper focus and that the proper focus may be maintained within the limits of the camera.

I claim:

1. The combination with a camera, of a casing carried thereby, a flexible coil carried by said casing and adapted to be unwound by pulling on one end of the coil, and means for regulating the focusing of the camera in accordance with the amount of the flexible coil which is unwound.

2. The combination with a camera having a lens adapted to be moved toward and away from the light receiving surface of the camera, of spring means for retracting the lens toward the light receiving surface of the camera, a movable member for regulating the amount of retraction of the lens, and means for actuating said movable member to permit the retraction of the lens for a predetermined distance.

3. The combination with a camera having a lens adapted to be moved toward and away from the light receiving surface of the camera, of spring means for retracting the lens toward the light receiving surface of the camera, a movable member for regulating the amount of retraction of the lens, means for actuating said movable member to permit the retraction of the lens for a predetermined distance, said last named means comprising a threaded spindle, a block having a threaded opening arranged to receive said spindle and to be moved by the rotation of the spindle, and means secured to the end of the spindle for rotating the latter.

4. The combination with a camera having a lens adapted to be moved toward and away from the light-receiving surface of the camera, of spring means for retracting the lens toward the light receiving surface of the camera, a movable member for regulating the amount of retraction of the lens, means for actuating said movable member to permit the retraction of the lens for a predetermined distance, said last named means comprising a threaded spindle, a block having a threaded opening arranged to receive said spindle and to be moved by the rotation of the spindle, and a flexible coil wound around one end of said spindle and adapted to rotate the spindle when one end of the coil is pulled out.

5. The combination with a camera, of a flexible coil secured thereto and adapted to be unwound by pulling on the end of the coil, and means for automatically maintaining the focus of the camera upon a plane at right angles to the axis of the lens and passing through the end of the flexible member in any position of the latter.

6. The combination with a camera, of a slidable lens frame, a carrier for said lens frame movable in a direction parallel to the major axis of the lens, spring means for placing said carrier under tension, a stop member movable transversely of the axis of the lens and adapted to engage the carrier for regulating the position of the letter.

7. The combination with a camera, of a slidable lens frame, a carrier for said lens frame movable in a direction parallel to the major axis of the lens, spring means for placing said carrier under tension, a stop member movable transversely of the axis of the lens and adapted to engage the carrier for regulating the position of the latter, and means comprising a threaded spindle for causing the transverse movement of said movable member.

8. The combination with a camera, of a slidable lens frame, a carrier for said lens frame movable in a direction parallel to the major axis of the lens, spring means for placing said carrier under tension, a stop member movable transversely of the axis of the lens and adapted to engage the carrier for regulating the position of the latter, means comprising a threaded spindle for causing the transverse movement of said movable member, and a flexible coil wound on one end of said spindle and adapted to be pulled out for causing the rotation of the spindle.

9. The combination with a camera, of a casing carried thereby, a flexible member carried by said casing and adapted to be unwound by pulling on one end of said flexible member, and means for regulating the focusing of the camera in accordance with the amount of the flexible member which is unwound.

10. A focusing attachment for cameras consisting of a revoluble drum adapted to be mounted on the camera, a flexible means wound on the drum, and means actuated by the drum to automatically focus the camera by the unwinding of said flexible means.

11. A focusing attachment for cameras consisting of a revoluble drum, a cord or tape wound thereon, reducing gear actuated by said drum, and a cam controlled by said gear whereby the unwinding of the cord or tape from the drum will cause automatic focusing of the camera.

12. The combination with a camera, of a casing carried thereby, flexible means carried by said casing and coiled thereon and adapted to be unwound by pulling on one end, and means for regulating the focusing of the camera in accordance with the amount of the flexible means which is unwound.

13. The combination with a camera and its lens-board, of a casing carried by said camera, a spring drum mounted in said casing and having a cord or tape coiled thereon, reducing gear actuated by said drum, and cam means actuated by said gear upon the unwinding of the cord or tape to actuate the lens-board and automatically focus the camera.

14. The combination with a camera having a hinged door carrying the bellows and lens frame, of a casing mounted on said door, a spring actuated drum mounted therein, a cord or tape coiled upon said drum, and means carried by said casing to engage the lens frame and focus the camera upon the uncoiling of the cord or tape from the drum.

15. In a camera, the combination with a shiftable focusing lens, a member designed to extend from the camera to the object to be photographed, lens focusing mechanism acting on said lens operatively actuated by said member and controlled by the reach of said member to the object to focus the lens on the object.

16. In a camera, the combination with a shiftable lens, a member adapted to reach to the object to be photographed and lens shifting mechanism controlled by the length of said member extended between the camera and object for setting said lens in focus relative to that object.

17. In a camera, a lens focusing device and a stretched member designed to reach to the object to be photographed, said member operatively connected to the focusing device and designed to maintain the lens in focus with the far end of said stretched member while in operative position.

18. In a camera, the combination with a shiftable lens carriage, means acting on said carriage for focusing the lens, a pull member operatively connected to said means and designed to permit the lens to be moved into progressive focusing positions from its minimum range focusing position as the free end of the pull member is drawn progressively away from the camera.

19. In a camera, the combination with a shiftable lens carriage, means acting on said carriage for focusing the lens, a pull member operatively connected to said means and designed to permit the lens to be moved into progressive focusing position from its minimum range focusing position as the free end of the pull member is drawn progressively away from the camera, said means designed so that the unit distance traveled by the end of said pull member bears a variable relation to the retrograde of said lens.

20. An automatic focusing attachment for cameras consisting of a spring actuated drum having a cord or tape coiled thereon and carried by the camera, the said coiled cord or tape serving when extended to the object tó be protographed to cause the focusing of the camera by the movement away from the camera of the end of the said coiled means.

21. An automatic focusing attachment for cameras consisting of a casing carried by the camera and flexible coiled means carried by the casing to cause when extended to the object to be photographed the focusing of the camera by the movement away from the camera of the end of the flexible coiled means.

FRANK M. STEADMAN.

Witnesses:
Solon C. Kemon,
Lester A. Stanley.